March 16, 1937.  W. C. ANTHONY  2,073,823
VEHICLE SUSPENSION
Filed Nov. 18, 1935
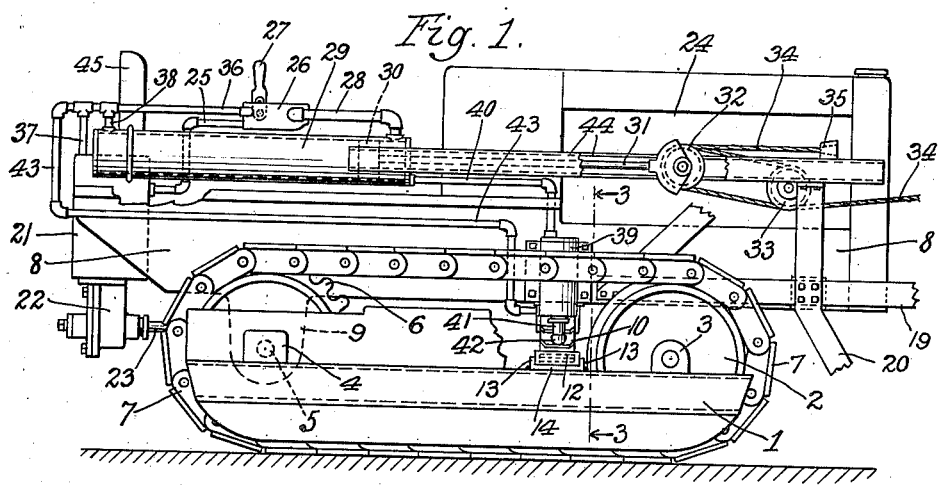
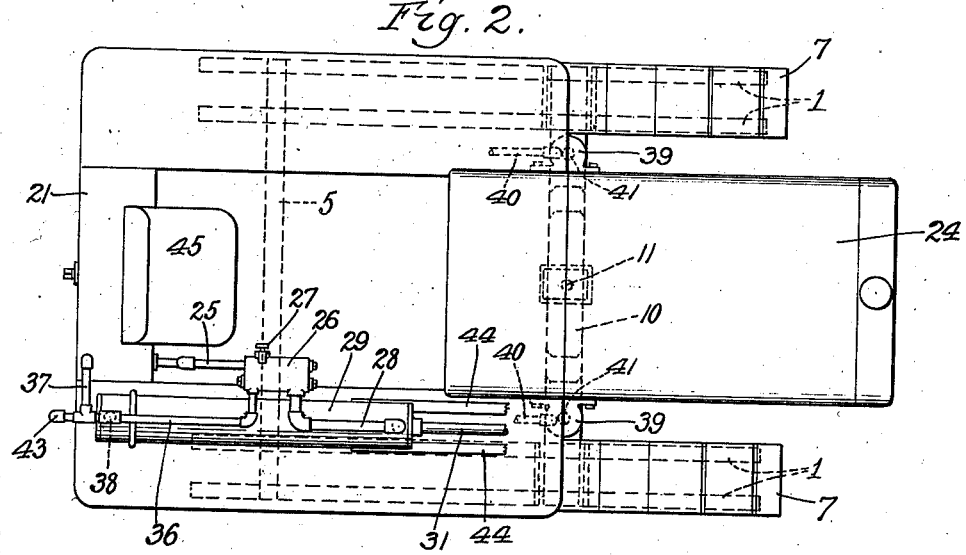
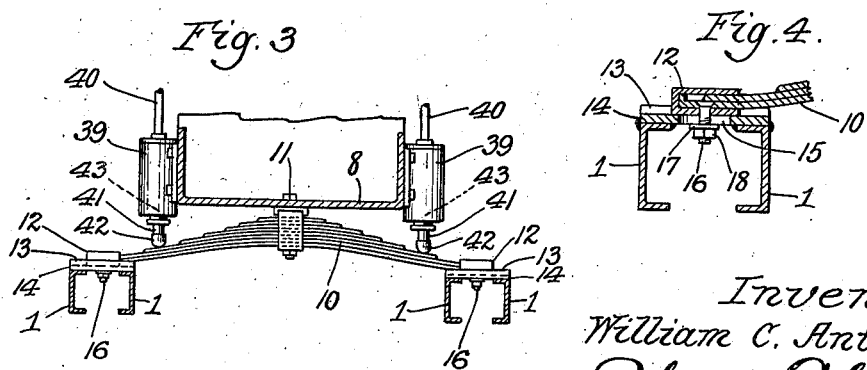
Inventor
William C. Anthony
by Parker & Carter
Attorneys Patented Mar. 16, 1937

2,073,823

UNITED STATES PATENT OFFICE 2,073,823

VEHICLE SUSPENSION

William C. Anthony, Streator, Ill., assignor to Anthony Development Company, a syndicate, Streator, Ill.

Application November 18, 1935, Serial No. 50,334

10 Claims. (Cl. 180—1)

This invention relates to means for suspending or supporting an automotive vehicle.

It has for one object to provide suspension and automatic counterbalancing means for the frame or chassis of a tractor from its running gear.

Another object is to provide in connection with an automotive vehicle which carries a hydraulic transmission and some sort of auxiliary tool supported on the vehicle frame, means associated with the hydraulic transmission for counterbalancing the load of the tool.

Another object is to provide means for automatically varying the counterbalancing effect in response to the varying load on the hydraulic transmission.

Other objects will appear from time to time in the specification and claims.

The invention is illustrated more or less diagrammatically in the accompanying drawing, wherein:—

Figure 1 is a side elevation with parts broken away, showing a vehicle to which the invention is applied;

Figure 2 is a plan view of the same with parts broken away;

Figure 3 is a transverse, generally vertical sectional detail, with parts in elevation, taken at line 3—3 of Figure 1;

Figure 4 is a sectional detail taken on a further enlarged scale, showing the mounting for one end of a spring.

Like parts are designated by like characters throughout the specification and drawing.

In the form shown, the invention is applied to a tractor having a crawler or creeper tread arrangement in which there are two crawlers with the necessary frame for supporting them, and a main body frame or chassis upon which the engine and transmission and other portions of the tractor proper are mounted. The frame or chassis is pivoted at one point on the crawler assembly and is yieldingly supported by a spring or otherwise from the crawler assembly at a point separated from the pivot.

As shown there is positioned on each side of the vehicle proper a crawler frame member 1. At one end of the frame member 1 there is mounted an idler 2 in any suitable bearing 3. Adjacent the opposite end of the frame 1 is a bearing 4 within which a shaft 5 is journaled. Secured to the shaft 5 at each end is a sprocket 6 from which the creeper belt 7 is driven. The belt passes about the idlers 2.

The vehicle proper comprises a frame of any desired shape. It is indicated here merely diagrammatically as comprising a frame 8. Depending downwardly from the frame are members 9 which engage the shaft 5 and by means of which the frame is supported upon the shaft 5 adjacent one end of the frame. Positioned forwardly of the shaft 5 is a transverse spring 10 which is secured to the vehicle frame 8 in any desired manner. As shown in Figure 3, a bolt 11 may pass through the spring and be secured to the frame. The details of this attachment are unimportant so long as some yielding means is provided for supporting the vehicle upon the creeper assembly or frame at a point sufficiently far from the shaft 5 to furnish adequate support for the frame. As shown in detail in Figure 4, each end of the spring 10 is carried in a slidable member 12 which rides in a contact 13, in a member 14 which is itself secured to the frame 1. A slot 15 permits a bolt 16 to extend downwardly through the member 14 and a washer 17 and nut 18 prevent upward displacement of the spring ends. Any other form of spring and mounting might be used.

While the mechanism of the present invention may be used in connection with other types of tractors, and with tractors which do not have additional tools attached to them, it finds an important use in connection with tractors of the creeper type and particularly when an auxiliary or additional tool is attached to or mounted upon such a tractor. Ordinarily this tool will be positioned forwardly of the tractor and, as indicating diagrammatically means for supporting such tool, frame members 19 and 20 are shown. Among the tools which may be used are shovels, scrapers, "bulldozers" and any other type of tool that can conveniently be suspended from or attached to or supported upon the tractor. Ordinarily such tool will be supported at the forward end of the tractor upon some suitable frame member and all or a part of the weight of the tool will be carried by the tractor. Usually some means is necessary for raising and lowering the tool and for otherwise operating it or for moving it from operative to inoperative position.

As a convenient means for accomplishing this a hydraulic drive is shown. This drive is shown in the accompanying drawing as comprising a sump or reservoir 21, a pump 22 driven by a shaft 23 from the power take-off of the tractor engine. The engine is not shown in detail but may be located under the hood or other housing indicated diagrammatically at 24. The pump is so arranged and attached to the sump or reservoir and provided with such connections that it discharges fluid under pressure through the pipe or conduit 25 to a control valve housing 26 which is provided with an operative handle 27. Fluid under pressure is discharged from the housing through a conduit 28 to the pressure side of a cylinder 29. Within this cylinder is positioned a piston 30 and projecting outwardly from the piston and the cylinder is a rod 31 which may carry a sheave 32. Positioned on suitable bearings on the tractor is a second sheave 33. A cable 34 may be anchored at 35, pass about the sheaves 32 and 33 and extend forwardly or in any other direction. The cable is indicated as showing merely one means for utilizing the hydraulic drive to move a tool and any other means may be used without departing from the spirit of the invention. 36 is a return flow conduit from the control valve housing 26 by means of which fluid may be returned to the conduit 37 and through it to the sump or tank 21. A connection 38 is made from the cylinder to the conduit 36 so that any leakage which occurs past the piston may be discharged from the cylinder. It will be understood that this mechanism just described is the main hydraulic power or driving cylinder for operating, handling or otherwise affecting the auxiliary tool which is carried on the tractor. The automatic counterbalancing mechanism will now be described.

In the particular form shown in the present drawing the counterbalancing arrangement comprises two auxiliary hydraulic cylinders 39, 39, mounted on the tractor frame, as shown generally in Figures 1 and 2, and in somewhat greater detail in Figure 3. Each is connected to the main cylinder on the pressure side by a conduit 40. For convenience this conduit is shown as connected to the cylinder itself on the pressure side. Obviously, however, it might be connected to any portion of the hydraulic assembly by means of which it would automatically receive pressure fluid at the same time and under the same pressure as the main hydraulic cylinder receives pressure fluid. Thus the pressure in the three cylinders is the same and variation of pressure is equally transmitted to the several cylinders. Each of the auxiliary cylinders 39 has mounted in it a piston from which extends downwardly and outwardly a rod 41. This rod may have a rounded foot or spring contacting member 42. As shown in Figures 1 and 3, this foot is in contact with the upper surface of the spring 10 adjacent its outer end. The foot might be arranged to contact the frame members 1. Thus it is not necessary that the foot be in direct contact with the spring. A return conduit 43 from the low pressure side of each auxiliary cylinder 39 to the return conduit 37 is provided. Thus fluid which leaks past the piston in either of the auxiliary cylinders is returned to the main fluid reservoir, tank or sump.

Guide tracks 44 may be provided on the tractor or tractor frame to support the outer end of the piston rod 31 and a seat 45 may be provided for the operator.

It will be realized that whereas I have herewith shown and described a practical operative device, nevertheless many changes might be made in the size, shape, number and disposition of parts without departing from the spirit of the invention and I wish, therefore, that my showing be taken as in a sense diagrammatic.

The use and operation of my invention are as follows:

Assuming that some tool has been mounted at the forward end of the vehicle, for example, on the frame members 19 and 20, and that the means for operating or for positioning or otherwise affecting this tool are connected to the cable 34, so that the tool is supported wholly or partly by the cable and through the hydraulic transmission; when not in use the tool may be allowed to rest upon the ground and there will be no pressure in the hydraulic cylinder. If now the tool is to be raised, pressure is admitted on the pressure side of the cylinder, the piston 30 is moved to the left and through the cable 34 or otherwise the tool is raised. This obviously brings an added load on the tractor frame and tends to compress or distort the spring 10 and to lower the forward end of the tractor with respect to the creeper assembly. It is one of the purposes of this invention to counteract this tendency and to counterbalance the effect of the added load. This is accomplished by the auxiliary counterbalancing cylinder assembly 39. Since as above pointed out they are in direct communication with the pressure side of the main cylinder 29 when fluid under pressure is admitted to the latter it is also admitted to the auxiliary cylinders 39 and their pistons 41 tend to be forced outwardly with a force sufficient to counteract the effect of the added load of the tool. Thus as the tool is raised from the ground and its weight brought upon the tractor frame, the effect of this added weight is counterbalanced by the hydraulic driving assembly. Should the tool be one which carries varying loads it will be one which puts varying loads upon the hydraulic driving, handling or hoisting mechanism, because the pressure in the main cylinder 29 is always exactly proportional to the load which it is carrying. The pressure thus varies with variations of the load. Since the auxiliary counterbalancing cylinders are directly connected to the main cylinder and, therefore, are subject to the same pressure as the main cylinder, the pressure in them also varies directly with variations of pressure in the main cylinder. Consequently the counterbalancing effect of the auxiliary cylinders varies with the load carried and is thus automatically varied to counteract that load so that no matter what the load may be, an adequate counterbalancing effect is produced in the auxiliary cylinders. This varies with variations in the load carried, and with the consequent variations of pressure in the main hydraulic driving cylinder.

I claim:

1. In combination in an automotive vehicle, a running gear assembly, a body assembly, means for supporting the said body assembly on the running gear assembly, and yielding means, separate from said first mentioned supporting means, for supporting the body assembly on the running gear assembly, an engine supported from said body assembly, and means positioned on said body assembly for raising a variable load, and means for counterbalancing the effect of said load, said means comprising an auxiliary load carrier supported from said body assembly and adapted to direct a supporting thrust upon said running gear assembly, said auxiliary load carrier comprising relatively movable parts and being connected with said load-raising means to be actuated thereby in response to variations in load.

2. In combination in an automotive vehicle, a running gear assembly, a body assembly, means for supporting the said body assembly on the running gear assembly, and yielding means, separate from said first mentioned supporting means, for supporting the body assembly on the running gear assembly, and engine supported from said body assembly, and means positioned on said body assembly for raising a variable load, a control for said load raising means, and means for counterbalancing the effect of said load, said means comprising an auxiliary load carrier supported from said body assembly and adapted to direct a supporting thrust upon said running gear assembly, said auxiliary load carrier comprising relatively movable parts and being connected with said load-raising means, means connecting the two to cause actuation of the counterbalancing means to a greater or less degree corresponding to variations in the load carried by the main load-raising means.

3. In combination in an automotive vehicle, a running gear assembly, a body assembly, means for supporting the said body assembly on the running gear assembly, and yielding means, separate from said first mentioned supporting means, for supporting the body assembly on the running gear assembly, an engine supported from said body assembly, and means positioned on said body assembly for carrying a variable load, comprising hydraulic moving means for moving said load, and means for automatically variably counterbalancing the effect of said load, said means comprising an auxiliary hydraulic load carrier supported in pressure circuit with said hydraulic raising means and from said body assembly and adapted to direct a supporting thrust upon said running gear assembly, said auxiliary load carrier comprising relatively movable parts and being directly connected with said load-raising means, to be actuated thereby in response to variations in load.

4. In combination in an automotive vehicle, a running gear assembly, a body assembly, means for supporting the said body assembly on the running gear assembly, and yielding means, separate from said first mentioned supporting means, for supporting the body assembly on the running gear assembly, an engine supported from said body assembly, and means positioned on said body assembly for carrying a variable load, hydraulic driving means for moving said load, and means for counterbalancing the effect of said load, said means comprising an auxiliary hydraulic load carrier, supported from said body assembly and adapted to direct a supporting thrust upon said running gear assembly and comprising auxiliary hydraulic cylinders, in pressure circuit with said main hydraulic drive.

5. In combination in an automotive vehicle, a running gear assembly, a body assembly, means for supporting the said body assembly on the running gear assembly, and yielding means, separate from said first mentioned supporting means, for supporting the body assembly on the running gear assembly, an engine supported from said body assembly, and means positioned on said body assembly for carrying a variable load, hydraulic driving means for moving said load, and means for counterbalancing the effect of said load, said means comprising an auxiliary hydraulic load carrier, supported from said body assembly and adapted to direct a supporting thrust upon said running gear assembly and comprising auxiliary hydraulic cylinders, in pressure circuit with said main hydraulic drive, the pressure in said auxiliary cylinders and said main drive being equal at all times, and varying automatically with load variations.

6. In combination in an automotive vehicle, a running gear assembly, a body assembly, means for supporting the said body assembly on the running gear assembly, and yielding means, separate from said first mentioned supporting means, for supporting the body assembly on the running gear assembly, an engine supported from said body assembly, and means positioned on said body assembly for carrying a variable load, hydraulic driving means for moving said load, and means for counterbalancing the effect of said load, said means comprising an auxiliary hydraulic load carrier, supported from said body assembly and adapted to direct a supporting thrust upon said running gear assembly and comprising auxiliary hydraulic cylinders, in pressure circuit with said main hydraulic drive, and conduit members defining a pressure circuit including the hydraulic driving means and the auxiliary load carrier, said conduit members being freely open between the said carrier and said hydraulic driving means, the pressure in said auxiliary cylinders and said main drive being equal at all times, and varying automatically with load variations.

7. In combination in an automotive vehicle, a running gear assembly, a body assembly, means for pivotally supporting the said body assembly on the running gear assembly, and yielding means, separate from said pivotal means, for supporting the body assembly on the running gear assembly, an engine supported from said body assembly, and raising means on said body assembly for raising and carrying a variable load, comprising hydraulic driving means, and means for automatically, variably counterbalancing the effect of said load, said means comprising an auxiliary hydraulic drive, supported from said body assembly and effective upon said running gear assembly and comprising auxiliary hydraulic cylinders, in pressure circuit with said main hydraulic drive, the pressure in said auxiliary cylinders and said main drive being equal at all times, and varying automatically with load variations.

8. In combination in a tractor, a running gear, and a chassis assembly supported thereon for relative motion with respect thereto in response to load variations, a power driven, load-carrying hoist mounted on said chassis, and automatic means for counterbalancing the effect of a load carried thereby, and of variations in said load, said automatic means comprising a plurality of devices, each device comprising a plurality of parts, one part of each device mounted on said chassis, the other part mounted on said running gear, said devices being in power circuit with and driven by said load-carrying means, whereby variations in driving load on said load-carrying hoist effect corresponding variations in said automatic counterbalancing devices.

9. In combination in a tractor, a running gear, and a chassis assembly supported thereon for relative motion with respect thereto in response to load variations, a power driven, hydraulic, load-carrying hoist mounted on said chassis, and automatic means for counterbalancing the effect of a load carried thereby, and of variations in said load, said automatic means comprising a plurality of hydraulic devices, each device comprising a plurality of parts, one part mounted on said chassis, the other part contacting said running gear, said hydraulic devices being in pressure circuit with and driven by said load-carrying means.

10. In combination with a vehicle, comprising a running gear assembly and a chassis assembly mounted therein for relative motion with respect thereto in response to load variations, a yielding support interposed between the running gear assembly and the chassis assembly, a hydraulic hoisting mechanism mounted upon the chassis, a drive therefor; and a plurality of auxiliary hydraulic supporting means positioned between the chassis and the running gear, bearing against the two and in hydraulic circuit with the hydraulic hoisting means, whereby relative movement between the chassis and the running gear is variably resisted in automatic response to variations in pressure of the hoisting means, and to variations in the load.

WILLIAM C. ANTHONY.